W. A. LORENZ.
SHEAR MECHANISM.
APPLICATION FILED MAR. 27, 1917.
1,326,460.
Patented Dec. 30, 1919.
2 SHEETS—SHEET 2.
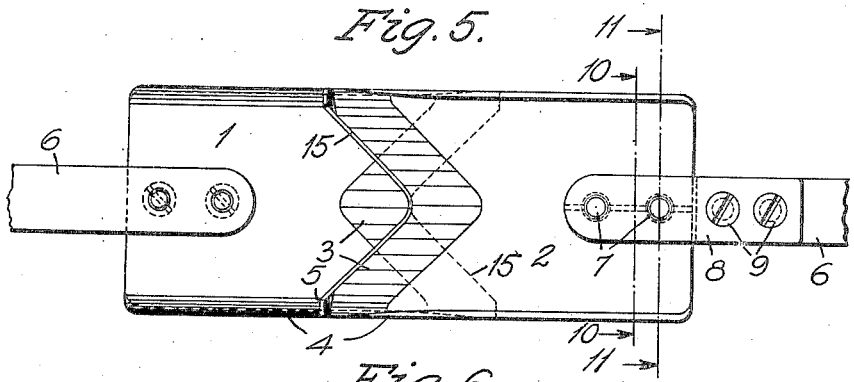
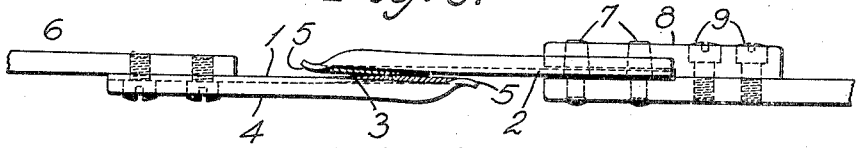
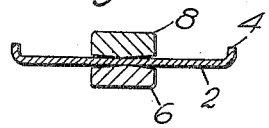
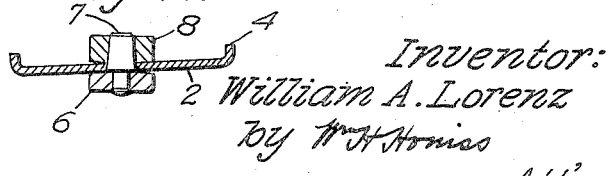
Witness:
Ernest L. Jarvis
Inventor:
William A. Lorenz
by W. H. Honiss
Att'y.

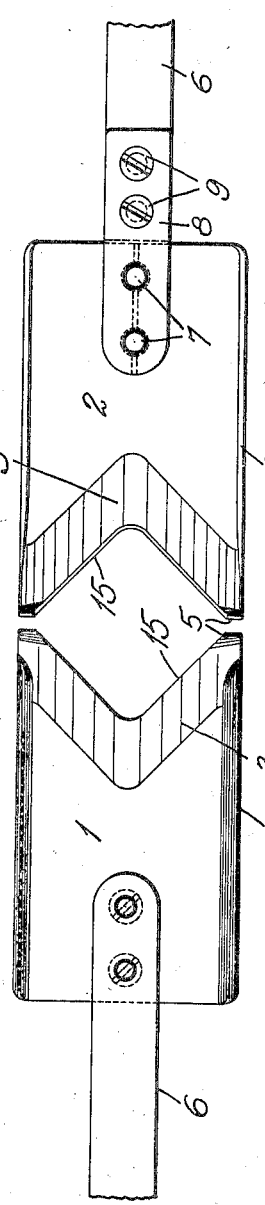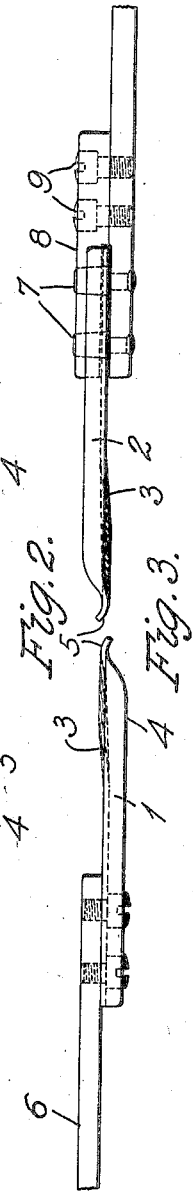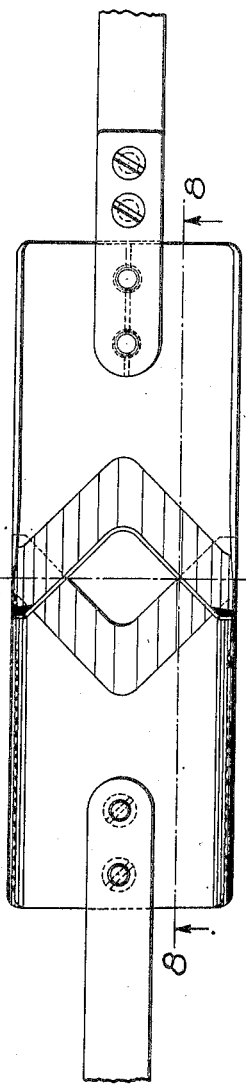

UNITED STATES PATENT OFFICE.

WILLIAM A. LORENZ, OF HARTFORD, CONNECTICUT, ASSIGNOR TO HARTFORD-FAIRMONT COMPANY, OF CANAJOHARIE, NEW YORK, A CORPORATION OF NEW YORK.

SHEAR MECHANISM.

1,326,460.     Specification of Letters Patent.     Patented Dec. 30, 1919.

Application filed March 27, 1917. Serial No. 157,668.

*To all whom it may concern:*

Be it known that I, WILLIAM A. LORENZ, a citizen of the United States, residing at Hartford, in the county of Hartford and State of Connecticut, have invented new and useful Improvements in Shear Mechanism, of which the following is a specification.

This invention relates to shear mechanism, and is herein shown and described as particularly designed for use in severing molten glass into drops or gathers to form charges of the required quantities for subsequent shaping into various articles of glassware, or for other treatment. Such shears are subject to extreme heat when operating upon molten glass and are therefore liable to rapid deterioration, requiring frequent re-sharpening and renewal. Moreover, the contact of the shear blades with the molten glass tends to chill the surfaces of the glass with which the blades are brought into contact, thus producing what are well known as "shear scars", which are liable to persist and appear in the finished ware. For these reasons, it is desirable to make these shear blades of thin material and otherwise of small mass in order to reduce their capacity of absorbing heat from the glass, and generally to reduce their initial cost, and the labor and consequent expense of re-sharpening and renewing them.

The object of this invention is to provide glass-cutting shears which are simple and inexpensive to make, which are effective in action and durable in use, and which, when necessary, can readily be resharpened, or can be renewed without material loss.

Figure 1 of the accompanying drawings shows in open position, a pair of blades formed according to this invention. Fig. 2 is an edge view of the opened blades projected from Fig. 1. Fig. 3 is a plan view of the same with the blades partly closed. Fig. 4 is an edge view of the partly closed blades. Fig. 5 shows a plan of the blades completely closed. Fig. 6 shows an edge view of the closed blades. Fig. 7 shows a central longitudinal section of the closed blades. Fig. 8 is a longitudinal section of the blades on the plane indicated by the line 8—8 on Fig. 3. Fig. 9 is a transverse section of the blades on the plane indicated by the line 9—9 on Fig. 3. Fig. 10 is a transverse section across a blade and its shank on the plane indicated by the line 10—10 on Fig. 5. Fig. 11 is a transverse section of the same on the plane indicated by the dotted line 11—11 on Fig. 5, the blade being shown in a tilted position.

The shear blades 1 and 2 are stamped to shape from relatively thin sheet steel. They are provided with reëntrant V-shaped cutting edges, which leave between them what is known as a "cat's-eye" opening more or less diamond shaped in form. The apexes of the V's formed by the reëntrant cutting edges are at the ends of the diamond, the side corners of the diamond being at the constantly changing two points where the edges of the two shear blades meet. As the shears are closed together, these two contacting points between the shear blades, forming the side corners of the diamond, approach each other, contracting the diamond or "cat's-eye" until the apexes of the V blades forming the ends of the diamond meet at the completion of the cut. Thus the cutting action tends to contract on all sides that porion of the neck or stream of the glass which is being severed, instead of spreading it sidewise as would be the case with two straight shear blades approaching each other on two opposite sides of the neck or gather, and having only a single point of contact between them at any given time.

These two points of contact are firmly and evenly maintained throughout the cutting movement, for which purpose at least one of the blades of each pair is mounted for sidewise rocking movement, which leaves the blades free to adjust themselves to each other, thus insuring constant contact and equal pressure at the two meeting points of the blades throughout their shearing action, from the time the blades meet at their ends until the points of contact meet at the apexes of the V-shaped notches in the blades. Moreover, the ends of the wings are so shaped that they will meet and slide over each other without collision, although set to give suitable pressure toward each other, to insure the proper shearing action. The V-shaped cutting edges are bent upwardly from the general plane of the blade, which enables them to remain in contact even when the planes of the blades are more or less inclined relative to the plane or planes of their longitudinal cutting movement or movements toward each other, thereby enabling the cutting edges to be raised or lowered by a swinging movement during their cutting action, without impairing that action.

The blades are preferably thin and of relatively small mass, so as to absorb a minimum of heat from the glass and to rapidly radiate with heat. They are similar in form, each being blanked out of relatively thin sheet steel by the same punch and die. The front ends of the blades are V-shaped, the front edges being slightly beveled as shown at 16 (Fig. 8), so that when the blades are closed together in coöperative action the edges will gradually shear off the material between them as they approach each other. The cutting edges 15 are also raised above the general plane of the blades, preferably by bending the blades shown at 3 in order to relieve the cutting edges and leave clearance behind them, between the planes of the respective blades. The two longitudinal outside edges 4 of each blade are turned down so as to give the blade sufficient rigidity for efficient action in use and also prevent the blades from being warped by the heat of hardening of the glass to which they are subjected. The terminals 5 at the forward ends of the V-shaped notches are bent downward so that when two blades, which are arranged back to back, come together for cutting they will ride past each other and not collide or engage in such manner that one will interfere with the movement of the other.

These blades are attached to shanks 6 which are designed to be secured to the shear carriers of the machine with which they are to be used. One or both of the blades may have a rocking connection with its shank in order to allow the blades to adjust themselves to each other and insure equal and firm contact at their two engaging points when they slide together in use to allow for mal-adjustment or the warping of the parts by the heat of the glass. The rocking blade may be held by studs 7, fastened to the shank, and by a cap 8 which is fastened to the shank by screws 9 so as to extend over the blade. In this case the opposing surfaces of the shank and the cap may be beveled or curved to allow the blade to rock on the studs between the parts on a longitudinal axis, as shown in Fig. 11. These blades will ride over each other back to back, the same whether arranged in the machine with which they are to be used in a horizontal plane or an inclined plane, or whether the machine reciprocates them in straight paths or swings them on arcs of a circle. The blades are set for use so that the lower one will be pressed upwardly and the upper one will be pressed downwardly by the resiliency of the shanks as the V-shaped cutting edges pass across each other when the blades are closing together for cutting. As a result of the shape of the ends of the blades will never catch when coming together, and as a result of the offsetting of the sections of the blade at 3 behind the V-cutting edges, there is clearance back of the edges so they will always ride in contact and cut sharply. As a result of the bending down of the sides the thin blades are rigid and the cutting edges kept true.

These blades, made in the form described, are inexpensive, durable and very efficient, and when worn by use they can be easily resharpened or they may be discarded and new ones substituted at little cost. Furthermore, as a result of the thinness of the metal from which they are made they make a thin clean cut in the glass, and absorb very little heat therefrom.

The invention claimed is:

1. A sheet metal shear blade for cutting molten glass, having a reëntrant cutting edge bent upwardly along a line substantially parallel with the edge, thereby raising a relatively thin cutting edge away from the general plane of the contiguous portions of the blade.

2. A pair of coöperating shear blades, each blade having a reëntrant cutting edge adapted to cross and coact with the edge of the other blade at two points during the shearing stroke, the cutting edges of the blades projecting toward each other from their respective contiguous portions, whereby the cutting edges contact with each other only at two points.

3. A pair of coöperating shear blades for cutting molten glass, one of the blades having a reëntrant cutting edge, and having its leading ends bent transversely away from the plane of the other blade to guide the blades past each other when they meet, whereby collision is prevented.

4. A shear blade for cutting molten glass, formed of relatively thin metal and having a reëntrant cutting edge, and also having its side edges bent away from the plane of the cutting side of the blade to stiffen the blade and reinforce its cutting edges, and having its leading ends bent transversely away from the cutting plane of the blade to guide the blade past any coöperating cutting edge and to avoid collision therewith.

5. A pair of coöperating shear blades for cutting molten glass, each blade being formed of relatively thin metal, and having a reëntrant cutting edge, each blade also having its side edges bent away from the plane of its coöperating blade, to stiffen the blade, and having its leading edge bent transversely away from the cutting plane of the blade to guide the blade past the coöperating blade and to avoid collision therewith.

6. A shear blade for cutting molten glass, supporting means for the blade, and means loosely connecting the blade to its supporting means to allow it to rock relative to its support, on an axis substantially in line with the direction of its cutting movement.

7. A pair of coöperating shear blades for cutting molten glass, supporting means for the blades, and means loosely connecting one of the blades to its supporting means to allow it to rock relative to its support, on an axis substantially in line with the direction of its cutting movement.

8. A pair of coöperating shear blades for cutting molten glass, one of the blades having a reëntrant cutting edge, supporting means for the blades, and means loosely connecting one of the blades to its supporting means, to enable it to rock relative to its support, on an axis substantially in line with the direction of its cutting movement.

9. A pair of coöperating shear blades for cutting molten glass, each blade having a reëntrant cutting edge offset from the blade toward the coöperating blade, so that only the cutting edges will engage when the blades are cutting, and having its leading ends beyond the cutting edges transversely bent away from the coöperating blade to avoid collision therewith.

10. A pair of coöperating shear blades for cutting molten glass, each blade having a reëntrant cutting edge, offset from the plane of that blade, to provide clearance behind the cutting edges, and each blade also having its side edges bent out of the plane of the blade, to stiffen the blade and reinforce its cutting edges.

11. A pair of coöperating shear blades for cutting molten glass, each blade being formed of sheet metal and having a reëntrant cutting edge with the leading ends of each blade bent out of the plane of the opposing blade, with sections of each blade offset toward the plane of the opposing blade so that only the cutting edges will engage when the blades are closed for cutting, and with the side edges of each blade bent out of the plane of the blade, to stiffen the blade and reinforce its cutting edges.

12. A pair of coöperating shear blades for cutting molten glass, each blade being formed of a resilient piece of sheet metal and having a V-shaped cutting notch in its front end, a supporting shank for each blade, and means loosely connecting one of said blades to its shank so that it will rock transversely.

13. A shear blade for cutting molten glass stamped to shape from sheet metal with a V-shaped cutting notch, in its front end, the edges of the blade along said notch being struck upwardly from the back of the blade, the extremities at the front end of said notch being bent downwardly, and the side edges of the blade being bent downwardly from the back.

Signed at Hartford, Connecticut, this 26th day of March, 1917.

WILLIAM A. LORENZ.